United States Patent [19]

Kamei et al.

[11] Patent Number: 4,479,159
[45] Date of Patent: Oct. 23, 1984

[54] PROCESS FOR DETECTING TRANSPORTED AND RESIDUAL TAPE AMOUNTS

[75] Inventors: Kazuo Kamei; Akira Orimoto, both of Saitama, Japan

[73] Assignee: Pioneer Electronic Corporation, Tokyo, Japan

[21] Appl. No.: 351,564

[22] Filed: Feb. 23, 1982

[30] Foreign Application Priority Data

Feb. 25, 1981 [JP] Japan .................................. 56-26671
Feb. 27, 1981 [JP] Japan .................................. 56-28113

[51] Int. Cl.$^3$ ............................................ G11B 19/28
[52] U.S. Cl. ..................................... 360/137; 360/73; 242/191
[58] Field of Search ....................... 360/71, 72.1–72.3, 360/73, 74.4, 137; 242/186, 191

[56] References Cited

U.S. PATENT DOCUMENTS 4,125,881 11/1978 Eige et al. ............................. 360/50
4,172,231 10/1979 d'Arc et al. ....................... 242/191 X
4,232,371 11/1980 Kamoto .......................... 242/186 X
4,280,159 7/1981 Nakayama ........................... 360/137
4,347,538 8/1982 Klank .................................. 360/137

Primary Examiner—John H. Wolff
Attorney, Agent, or Firm—Sughrue, Mion, Zinn, Macpeak & Seas

[57] ABSTRACT

A process for calculating the amount of recording tape or time left remaining on a tape reel includes sensing the rotational period of both the supply and take-up reels, and performing operations on this data to derive the value for the remaining/transported tape amount, the operations performed depending upon the direction of tape travel. In addition, the process may include disregarding data obtained during times of highly variable tape speed, such as when changing tape transport direction, etc. The invention may be used in connection with a reversible-type tape recorder capable of reproduction or recording in both tape transport directions.

11 Claims, 6 Drawing Figures

PROCESS FOR DETECTING TRANSPORTED AND RESIDUAL TAPE AMOUNTS

BACKGROUND OF THE INVENTION

This invention relates to a process for detecting the amount of transported and/or remaining tape on a reel or the like, and more particularly, to a process for detecting such for a reversible type tape recorder in which reproduction can be performed in normal and reverse directions.

As a conventional example of a process for detecting the amount of transported or residual tape in a tape recorder, it has been proposed that firstly, the rotational periods of the pair of tape reels are to be detected, respectively, so that the tape amount may be computed through predetermined operational equations from the thus detected rotational period signals.

According to this electronic method, it is possible to detect the tape amount more accurately than with a conventional mechanical tape counter.

However, in a conventional reversible type tape recorder, there has not been provided any means which detects the amount of the transported/residual tape and displays the amount in terms of the actual time remaining on the tape. Therefore, a successive display of the time representative of the tape amount has been needed for the reversible type tape recorder.

Further, as the tape speed fluctuates for a predetermined period of time just after one operation mode of the tape recorder is changed to the other, it is impossible to compute the tape amount through operational equations, accurately. Therefore, it is unnecessary to detect such a tape amount until the tape speed is stabilized. In such a period, since the tape speed is unstable, the thus obtained rotational period data signal is meaningless.

SUMMARY OF THE INVENTION

An object of the invention is to provide a process for detecting the amount of transported and/or residual tape, and then display the amount in terms of the time corresponding thereto regardless of whether reproduction in the forward or reverse direction is performed. More specifically, the present invention provides a switch means, by which both the normal and reverse rotational period data signals are exchanged with one another in response to the direction of reproduction, so that the tape amount is accurately computed.

Another object of the invention is to provide a process for detecting the amount of transported and/or residual tape wherein the function of the means for detecting rotational periods is stopped during an interval of unstable tape speed. More specifically, the present invention provides for stopping the detection of the tape amount during an interval of unstable tape speed just after the changing of the operational mode. Therefore, the detection of the rotational periods of the tape reels is performed only in the stable tape speed condition, or computation using operational equations is performed in such interval only.

DETAILED DESCRIPTION OF THE PREFERRED EMBODIMENTS

Figure 1:
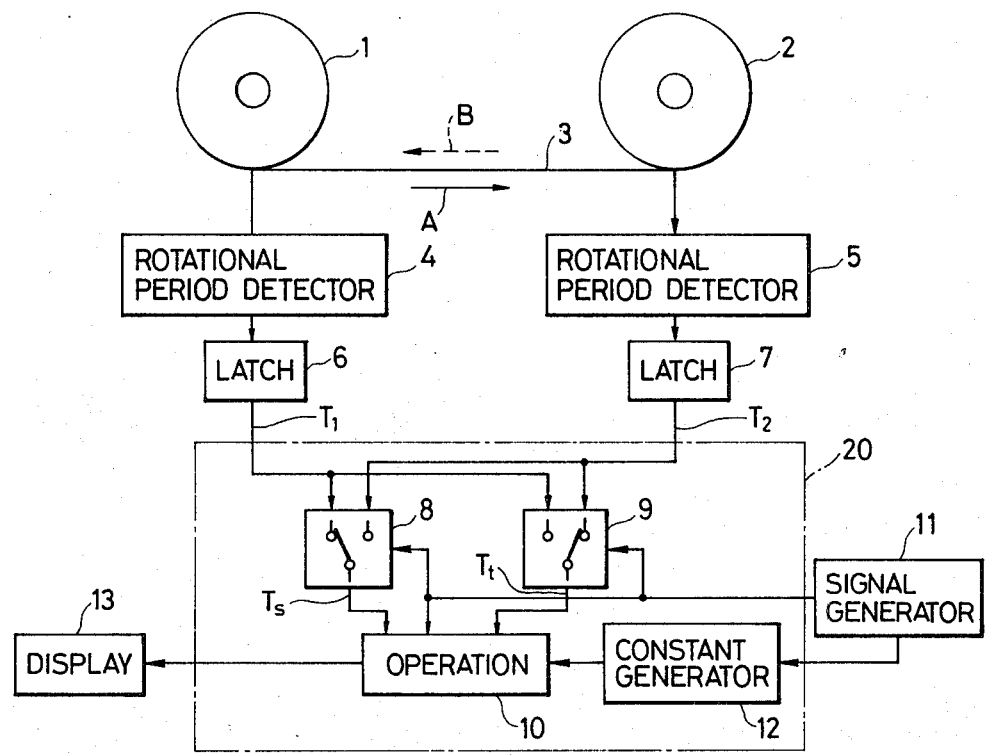
FIG. 1 is a block diagram of one embodiment according to the present invention.

In FIG. 1, reference numeral 1 designates a tape reel for supplying tape (hereinafter referred to as "a supply reel" when applicable); 2, a tape reel for winding tape (hereinafter referred to as "a take-up reel"); 3, the tape; 4 and 5, detecting means for determining the rotation periods $T_1$ and $T_2$ of the supply reel 1 and the take-up reel 2, respectively. The detecting means may be composed of a tacho-generator or an assembly of a rotational slit plate and photo-coupler. That is, data signals representative of periods $T_1$ and $T_2$ are obtained by well-known detecting means. Further, latch circuits 6 and 7 are provided to temporarily latch (or store) the obtained data from the detecting means 4 and 5 therein every predetermined period of time. Outputs from the circuits 6 and 7 are respectively applied through transfer switches 8 and 9 to an operation circuit 10. Here, the transfer switches 8 and 9 are switched by signals outputted from a signal generator 11 instructing the direction of the reproduction or the display of the transported/residual amount of the tape according to the normal or reverse directions. In the operation circuit 10, the data signals representative of the rotational periods $T_1$ and $T_2$ respectively and constants outputted from a constant signal generator 12 are inputted, and computation subject to predetermined equations is performed therein.

As a result, the computed result is displayed on a display means 13 for displaying the tape amount.

For example, if the rotational periods of the supply reel and the tape-up reel are $T_s$ and $T_t$, respectively, the transported amount $L_2$ and the residual amount $L_1$ of the tape can be computed as follows:

$$L_1 = K_1 \cdot T_s^2 - K_2 \tag{1}$$

$$= K_1'/\{1 + (T_t/T_s)^2\} - K_2' \tag{2}$$

$$L_2 = K_1 \cdot T_t^2 - K_2 \tag{3}$$

$$= K_1'/\{1 + (T_s/T_t)^2\} - K_2' \tag{4}$$

where, constants $K_1$, $K_1'$, $K_2$ and $K_2'$ are defined by the hub diameter of the tape reel, the depth of the tape, and the tape speed. Accordingly, if the rotational periods of the reels are detected, the transported or residual amount of the tape can be readily computed from the above equations.

If reproduction in the normal direction is performed with a constant tape speed, as denoted in FIG. 1 by a solid line arrow A, the rotational periods $T_1$ and $T_2$ will respectively correspond to $T_s$ in equation (1) and $T_t$ in equation (2), for computing the residual amount of tape. At the same time, in order to compute the transported amount of tape, the rotational periods $T_1$ and $T_2$ must correspond to $T_s$ in equation (3) and $T_t$ in equation (4). Therefore, the transfer switches 8 and 9 are controlled so as to respectively select $T_1$ and $T_2$ as $T_s$ and $T_t$, by an instruction signal of the signal generator 11 for instructing the direction of reproduction or the display of the transported/residual amount of tape, and then $T_1$ and $T_2$ are inputted to the operation circuit 10. In parallel, the constant signals such as $K_1$, $K_1'$, $K_2$ and $K_2'$ which are selectively outputted from the generator 12 as occasion demands, are inputted to the operation circuit 10. That is, the following computations are performed in the operation circuit 10.

$$L_1 = K_1 \cdot T_1^2 - K_2 \text{ or } K_1'/\{1+(T_2/T_1)^2\} - K_2' \quad (5)$$

$$L_2 = K_1 \cdot T_2^2 - K_2 \text{ or } K_1'/\{1+(T_1/T_2)^2\} - K_2' \quad (6)$$

Sequentially, if reproduction in the reverse direction is performed with a constant tape speed, as denoted in FIG. 1 by a dotted arrow B, the tape reels 2 and 1 respectively serve as a supply reel and a take-up reel, in contrast with reproduction in the normal direction. Therefore, $T_2$ and $T_1$ must respectively be made to correspond to $T_s$ and $T_t$ in the above described equations (1) to (4). Therefore, the transfer switches 8 and 9 are respectively controlled by an output from the signal generator 11 so as to select $T_2$ and $T_1$ as $T_s$ and $T_t$. Accordingly, the following computations are performed in the operation circuit 10.

$$L_1 = K_1 \cdot T_2^2 - K_2 \text{ or } K_1'/\{1+(T_1/T_2)^2\} - K_2' \quad (7)$$

$$L_2 = K_1 \cdot T_1^2 - K_2 \text{ or } K_1'/\{1+(T_2/T_1)^2\} - K_2' \quad (8)$$

As is clear in FIG. 1, it is possible to miniaturize the circuit enclosed in the dot-and-chain box by using a microcomputer 20. In that case, a CPU (central processing unit) and a ROM (read only memory) are respectively usable as the operation circuit 10 and the constant generator 12. Further, the operation of the transfer switches 8 and 9 may be programed in the microcomputer 20.

Figure 2:
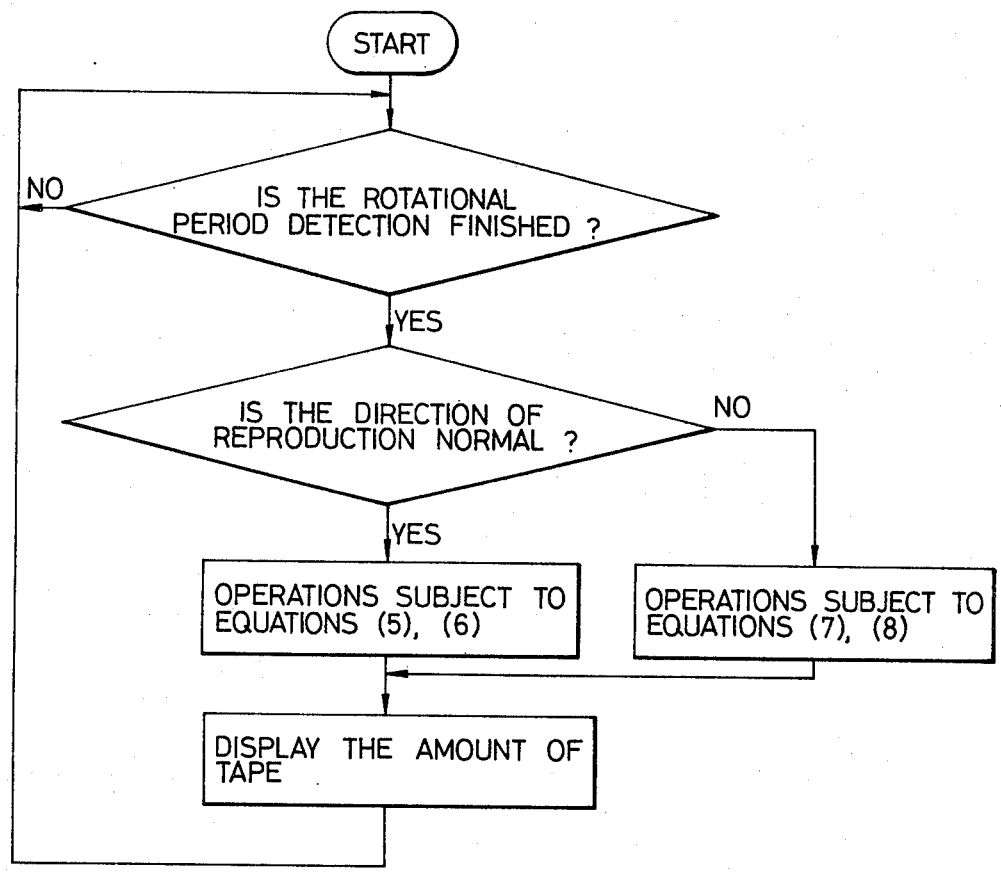
FIG. 2 is a flow-chart describing the operation of the embodiment of FIG. 1.

In FIG. 2, the process in the thus constructed microcomputer 20 is illustrated by means of a flow-chart.

As is seen from the above-description, it is possible to immediately display an accurate tape amount in both the normal and reverse reproduction modes of the reversible type tape recorder by an extremely simplified process.

Figure 4:
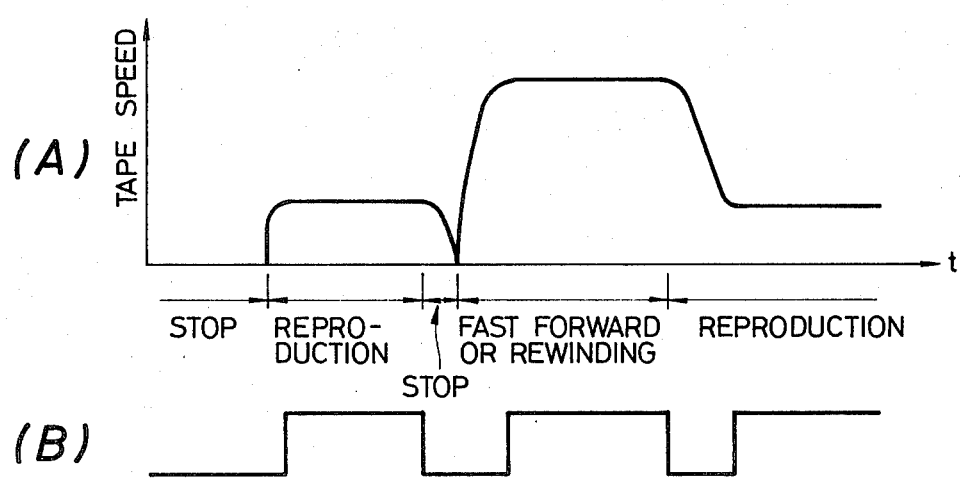
FIG. 4A is a timing-chart of the operation of the second embodiment.
FIG. 4B is a timing-chart of the generation of a high level signal outputted from the tape speed detector means of the second embodiment.

However, if the operation mode of the tape recorder is changed, or if the operation is changed from reproduction to a fast forwarding or rewind mode, the tape speed fluctuates remarkably during such a transition period as shown in FIG. 4A.

Accordingly, the computed results from the above equations (1) and (2) could not be accurate, because the values representative of the rotational periods to be used as $T_s$ or $T_t$ in equations (1) to (2) are not reliable and constants from the signal generator 12 subject to the tape speed are not definitely determined.

Figure 3:
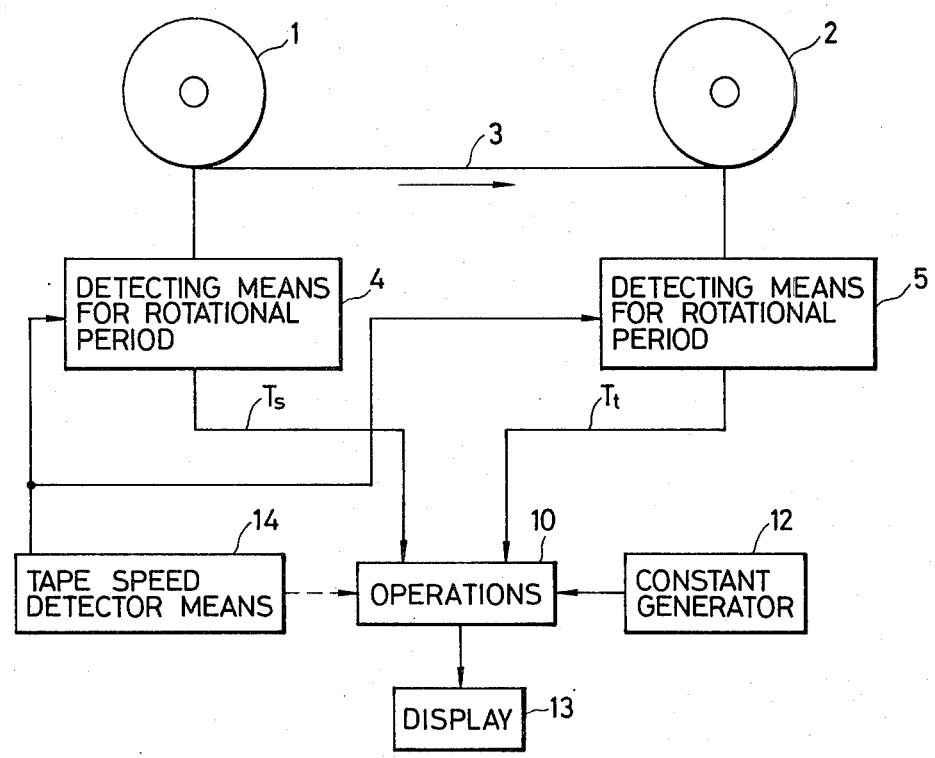
FIG. 3 is a block diagram of a second embodiment according to the present invention.

Therefore, in order to eliminate the above drawback, an embodiment is proposed as shown in FIG. 3, wherein a tape speed detector means 14 coupled to the detecting means 4 and 5 is provided to detect the tape speed. In FIG. 3, identical parts are numbered correspondingly to those in FIG. 1.

More specifically, a high level signal is outputted from the tape speed detector 14 when the tape speed is maintained constant. In this case, the detecting means 4 and 5 are provided so as to detect the rotational periods as long as a high level signal is inputted thereto, but not in the low level signal state.

As another example, it is possible that the operations of the operation circuit 10 may be performed only during the high level state, but not while the circuit 14 outputs the low level signal. This alternative is illustrated by the dotted arrow in FIG. 3.

Furthermore, it is possible for a timer means to be provided to output a high level signal for a predetermined period of time after the changing of an operation mode, because the tape speed customarily becomes constant in a constant period of time after the changing of operation modes. As an example of the operation of the timer means, it may be acceptable to generate a high level controlling signal after detecting a predetermined number of rotations. Of course, other modes could also be applicable.

The tape speeds are different in the reproduction mode and the fast forwarding mode, respectively. Therefore, it is necessary to change the constants $K_1$, $K_1'$, $K_2$ and $K_2'$ in equations (1) and (2) in response to the changed tape speed. However, it is quite easy to control the constant generator 12 so as to generate such alternative constants in response to the changed mode.

Figure 5:
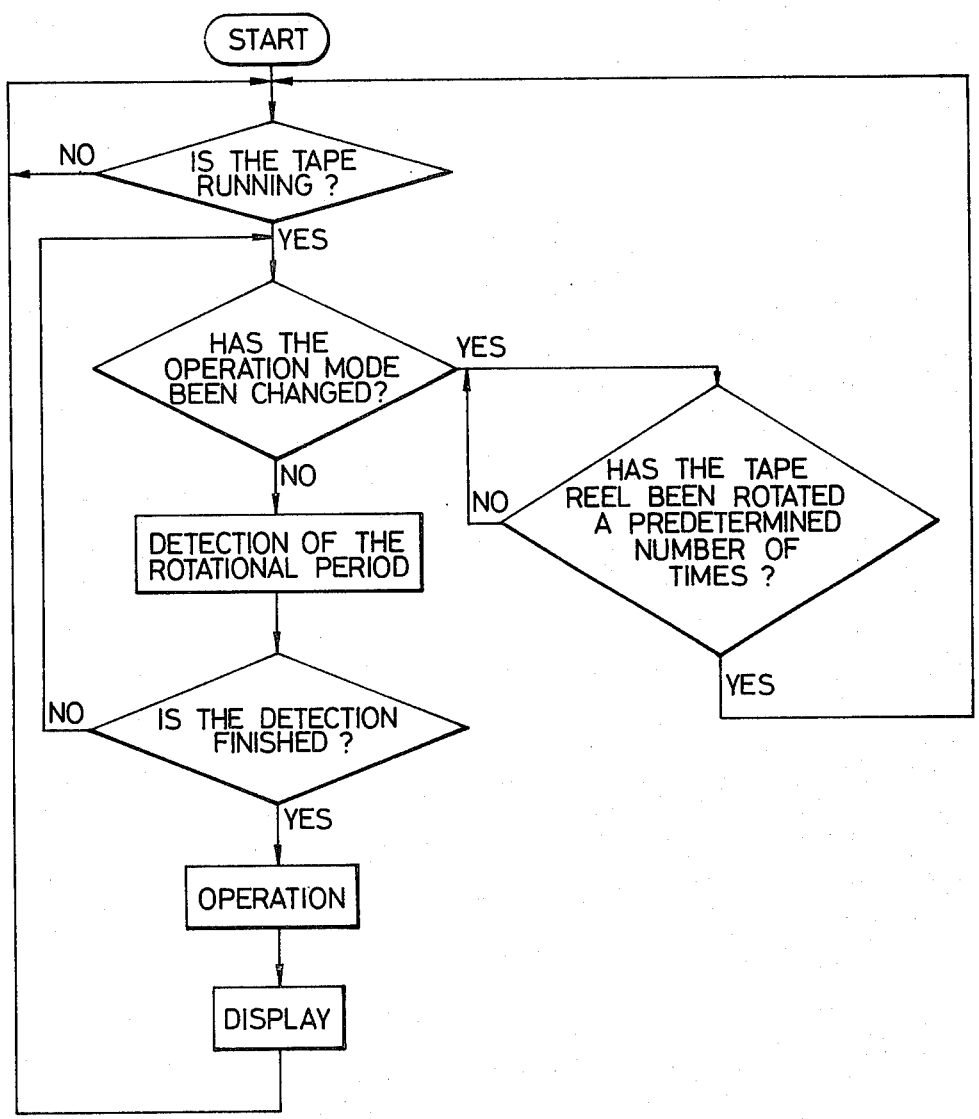
FIG. 5 is a flow-chart of the second embodiment.

Similarly as in FIG. 1, the operation circuit 10, the constant generator 12 and the tape speed detector means 14 of FIG. 3 may be replaced by a micro-computer. Particularly, a CPU (central processing unit) and a ROM (read only memory) may respectively replace the operation circuit 10 and the constant generator 12. In this case, the function of the tape speed detector means 14 may readily be taken into consideration in the programming of the micro-computer. FIG. 5 is a flow-chart showing the operation of the micro-computer according to the second embodiment. In this chart, it is seen that the microcomputer operates to detect the rotational period of the tape only after the predetermined number of the rotations is detected, just after a changing of the operation mode of the tape recorder, instead of detecting the tape speed during this interval.

Accordingly, it is possible to display an accurate tape amount, while an erroneous detection of the tape amount is prohibited in a transition period during operation mode changing. In addition, according to the present invention, if a display means 13 is available for displaying both the amount of transported and residual tape, the operation circuit 10 may be constituted so as to compute operations subject to equations (1), (2) and (3), (4). On the other hand, if a display means 13 is only available for either the transported or the residual amount of the tape, the operation circuit 10 is sufficient if constituted so as to compute operations subject to equations (1), (2) or (3), (4) in response thereto.

It is apparent from the foregoing that the process results are applicable to control other systems than merely a display.

What is claimed is:

1. A process for determining the amount of transported or residual tape in either tape transportation direction of a reversible type tape recorder by using predetermined operation equations for calculating the amounts of transported and residual tape, respectively, comprising detecting respective rotational period data signals corresponding to the respective rotational periods of a pair of tape reels of said reversible type tape recorder, temporarily storing the data signals, operating on said stored respective data signals using said respective equations to produce outputs signals corresponding to at least one of said amounts of tape, and wherein said respective rotational period data signals which are operated upon by using said respective equations are exchanged with one another in response to a change in the direction of transportation of said tape.

2. The process as claimed in claim 1, wherein said detecting step is performed only when said tape runs at a substantially constant speed.

3. The process as claimed in claim 1, further comprising performing said operating step only during times when said tape runs at a substantially constant speed.

4. The process as claimed in claim 1, 2 or 3, wherein whether said tape is running at said constant speed is detected by tape speed detector means.

5. The process as claimed in claim 1, 2 or 3, wherein whether said tape is running at said constant speed is detected by timer means initiated when an operating mode of said tape recorder is changed.

6. The process as claimed in claim 1, 2 or 3, wherein whether said tape is running at said constant speed is detected by counter means counting a predetermined number of reel revolutions after a change in operating mode of said tape recorder.

7. A process for determining the amount of transported or residual tape in either tape transportation direction of a reversible type tape recorder having first and second reels functioning as supply and take-up reels, respectively, in the forward direction of tape transportation, and as take-up and supply reels, respectively, in the reverse direction of tape transportation, comprising:

detecting the rotational periods of said first and second reels and producing first and second data signals corresponding to said rotational periods, respectively;

temporarily storing said first and second data signals;

selectively operating upon said first and second data signals in accordance with first and second equations for calculating the respective amounts of residual and transported tape on said reels for both the forward and reverse directions of tape transportation to produce output signals corresponding to at least one of said amounts of tape; and using, in said operating step, said first and second data signals with said first and second equations, respectively, for said forward direction of tape transportation, and using said second and first data signals in said first and second equations, respectively, for said reverse direction of tape transportation.

8. The process as claimed in claim 7, further comprising determining the amount of tape only when the tape is running at a substantially constant speed.

9. An apparatus for determining the amount of transported or residual tape in a reversible type tape recorder having first and second reels functioning as supply and take-up reels, respectively, in the forward direction of tape transportation, and as take-up and supply reels, respectively, in the reverse direction of tape transportation, comprising:

detector means for detecting the rotational periods of said first and second reels and for producing first and second data signals corresponding to said rotational periods, respectively;

latch means for temporarily storing said first and second data signals;

operation circuit means for selectively operating upon said first and second data signals in accordance with first and second equations and calculating the respective amounts of transported and residual tape on said reels for both the forward and reverse directions of tape transportation to produce output signals corresponding to at least one of said amounts of tape;

said operation circuit means having first and second input terminals for receiving data signals functioning as said supply and take-up reels, respectively; and transfer switch means, coupled between said latch means and said first and second terminals, responsive to the direction of tape transportation for transferring said first and second data signals to said first and second terminals, respectively, for said forward direction of tape transportation, and for transferring said second and first data signals to said first and second terminals, respectively, for said reverse direction of tape transportation.

10. The apparatus as claimed in claim 9, further comprising means for enabling said detector means only when the tape is running at a substantially constant speed.

11. The apparatus as claimed in claim 9, further comprising means for enabling said operation circuit means only when the tape is running at a substantially constant speed.

* * * * *